United States Patent
Romanenko

(10) Patent No.: US 9,384,561 B2
(45) Date of Patent: Jul. 5, 2016

(54) METHOD OF SELECTING A REGION OF INTEREST

(71) Applicant: Apical Ltd, London (GB)

(72) Inventor: Ilya Romanenko, London (GB)

(73) Assignee: APICAL LTD, London (GB)

( * ) Notice: Subject to any disclaimer, the term of this patent is extended or adjusted under 35 U.S.C. 154(b) by 0 days.

(21) Appl. No.: 14/609,204

(22) Filed: Jan. 29, 2015

(65) Prior Publication Data

US 2015/0221101 A1 Aug. 6, 2015

(30) Foreign Application Priority Data

Jan. 31, 2014 (GB) .................................. 1401697.6

(51) Int. Cl.
| | | |
|---|---|---|
| *G06K 9/34* | (2006.01) | |
| *G06T 7/40* | (2006.01) | |
| *G06K 9/46* | (2006.01) | |
| *G06K 9/00* | (2006.01) | |
| *G06T 7/00* | (2006.01) | |
| *G06K 9/62* | (2006.01) | |
| *G06K 9/32* | (2006.01) | |

(52) U.S. Cl.
CPC ............ *G06T 7/408* (2013.01); *G06K 9/00234* (2013.01); *G06K 9/3241* (2013.01); *G06K 9/4652* (2013.01); *G06K 9/6212* (2013.01); *G06T 7/0081* (2013.01); *G06T 7/0083* (2013.01); *G06T 2207/10024* (2013.01); *G06T 2207/20132* (2013.01); *G06T 2207/20144* (2013.01)

(58) Field of Classification Search
USPC .......... 382/164, 162, 128, 154, 285; 345/421; 348/452, 699, E5.066; 370/395.31; 378/41; 709/238
See application file for complete search history.

(56) References Cited

U.S. PATENT DOCUMENTS

| | | | | |
|---|---|---|---|---|
| 5,005,077 | A * | 4/1991 | Samad | G06T 7/202 348/452 |
| 5,086,496 | A * | 2/1992 | Mulmuley | G06T 15/405 345/421 |
| 6,631,136 | B1 * | 10/2003 | Chowdhury | H04L 45/02 370/395.31 |
| 7,194,117 | B2 * | 3/2007 | Kaufman | A61B 5/055 378/41 |
| 7,477,768 | B2 * | 1/2009 | Kaufman | G06T 7/0012 378/41 |
| 8,391,594 | B1 | 3/2013 | Wang et al. | |
| 8,406,566 | B1 | 3/2013 | Wilensky et al. | |
| 2007/0133862 | A1 | 6/2007 | Gold et al. | |
| 2009/0196349 | A1 | 8/2009 | Park et al. | |
| 2009/0297031 | A1 | 12/2009 | Pettigrew et al. | |
| 2009/0300553 | A1 | 12/2009 | Pettigrew et al. | |
| 2010/0278424 | A1 | 11/2010 | Warner | |
| 2012/0148151 | A1 | 6/2012 | Hamada et al. | |
| 2013/0336582 | A1 | 12/2013 | Dai | |

FOREIGN PATENT DOCUMENTS

WO 02052739 A1 7/2002

* cited by examiner

*Primary Examiner* — Anh Do
(74) *Attorney, Agent, or Firm* — EIP US LLP

(57) ABSTRACT

A method of selecting at least one region of interest within an image includes the selection of a preliminary region having a preliminary border. The selection uses one or more characteristics of the image. An inner probability distribution of color components is determined within the preliminary region and an outer probability distribution of color components outside the preliminary region. The preliminary border is adjusted in dependence on the probability distributions, the adjusted border defining the at least one region of interest.

33 Claims, 9 Drawing Sheets

METHOD OF SELECTING A REGION OF INTEREST

CROSS-REFERENCE TO RELATED APPLICATIONS

This application claims the benefit under 35 U.S.C. 119(a) and 37 CFR 1.55 to UK patent application no. GB1401697.6, filed on Jan. 31, 2014, the disclosure of which is hereby incorporated by reference in its entirety.

BACKGROUND OF THE INVENTION

1. Field of the Invention

The present application relates to a method of selecting a region of interest in an image.

2. Description of the Related Technology

Methods are known for selecting a region of interest (ROI) in an image. For example, it may be desirable to identify a region corresponding to a human face, or to identify a region corresponding to sky in a landscape image.

An ROI may be manually identified by a user, for example by using a mouse to outline the region. However, it is often desirable to select this region automatically, for example to achieve improved speed or accuracy compared with manual selection by the user.

Methods are known for automatic region selection, for example face recognition algorithms which identify the presence and location of human faces, or color analysis algorithms which select a region corresponding to a given range of colors.

In order to produce a natural-looking result when applying different processing methods to different regions of an image, it is often necessary to identify the border of the ROI to a high degree of accuracy, for example within one pixel. Existing methods are often unable to achieve this level of precision.

SUMMARY

According to a first aspect, there is provided a method of identifying at least one region of interest within an image, the method comprising:

selecting a preliminary region having a preliminary border using one or more characteristics of the image;

determining an inner probability distribution of color components within the preliminary region and an outer probability distribution of color components outside the preliminary region;

adjusting the preliminary border in dependence on the probability distributions, the adjusted border defining the at least one region of interest.

The method refines a previously approximately identified ROI by separately analyzing the distribution of colors within and outside the preliminary region. Pixels close to the border of the preliminary ROI are then either included within, or excluded from, the ROI by determination of their degree of correspondence to the color distributions within and outside the ROI.

A second aspect relates to a method of processing an image, the method including:

selecting a region having a border using one or more characteristics of the image;

selecting a border region including the border;

applying a first algorithm to the region excluding at least partially the border region.

Embodiments further relate to an apparatus for processing an image adapted to carry out one or both of the above methods.

Embodiments further relate to a computer program product comprising a non-transitory computer readable storage medium having a computer program in the form of computer readable instructions stored thereon, the computer program causing a computerized device to perform one or both of the above methods Further features and advantages of embodiments will become apparent from the following description of certain illustrated embodiments, given by way of example only, which is made with reference to the accompanying drawings.

DETAILED DESCRIPTION OF CERTAIN INVENTIVE EMBODIMENTS

Region of interest selection is the process by which a region within an image may be selected. For example, it may be desirable to identify a region corresponding to grass within a landscape image, or to identify a region corresponding a human face. Many methods for identifying regions of interest are known in the art.

Figure 1:
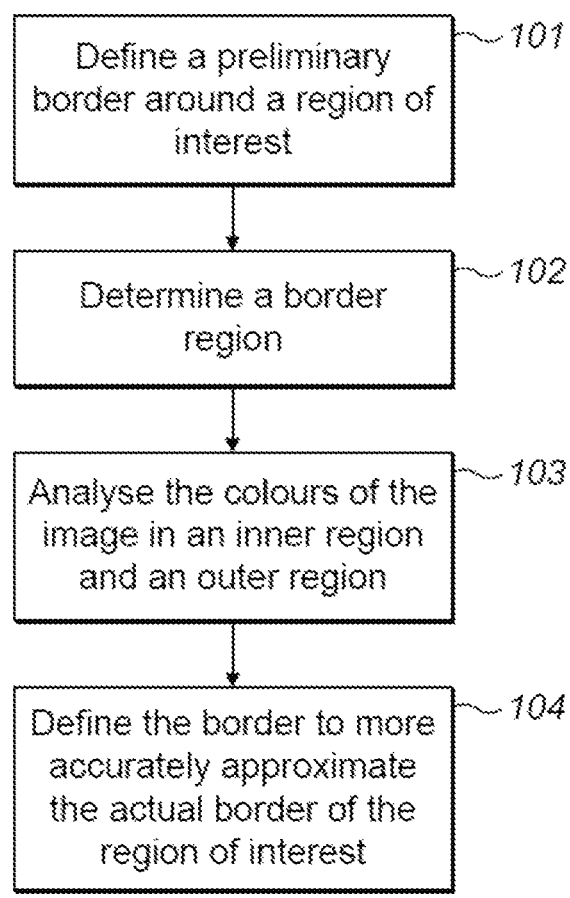
FIG. 1 shows a method for identifying the border of an object in an image.

FIG. 1 shows schematically a method according to one embodiment, in which a region of interest corresponding to an object in an image is identified. A preliminary border corresponding approximately to the border of the region of interest is defined 101. This is then used to determine a border region 102 which defines an inner region inside the inner edge of the border region, and an outer region outside the outer edge of the border region. The color components of the image are then analyzed separately for the inner region and the outer region 103, following which the border of the region is refined to more accurately approximate the actual border of the region of interest 104.

Figure 2A:
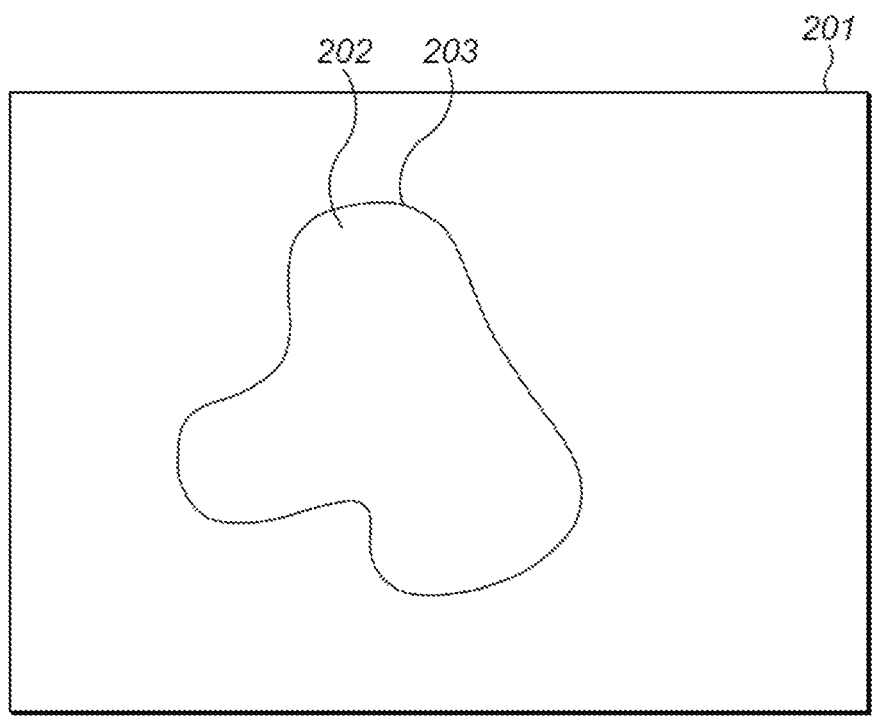
FIGS. 2a-2e show an image containing an object, with various methods for defining a border region.

FIG. 2a shows an image 201 including an object 202. The part of the image occupied by the object is the region of interest (ROI) 202. The ROI has a border 203. The method approximates the location and extent of the ROI 202 by determining the location of the border 203.

A preliminary region surrounded by a preliminary border corresponding approximately to the object 202 may be identified using one or more known object identification techniques. For example, colors in the image may be analyzed to identify a region of blue pixels corresponding approximately to sky in a landscape image. Other examples of methods which may be used to identify the preliminary region include the use of a computer facial recognition algorithm to identify a region corresponding to a human face or, where the image contains depth information, the preliminary region may be identified as containing pixels corresponding to a given depth range. In a particular embodiment the identification technique does not use color.

A first border region is determined that should be sufficiently wide to include all or substantially all of the border 203 of the ROI. The first border region may extend outside or inside the preliminary border, in which case it borders on the preliminary border. Alternatively, the first border region may extend on both sides of the preliminary border. The width of the first border region depends on the shape of the ROI and the properties of the identification technique used for determining the preliminary border. Its width should be large enough to include substantially all of the border 203 but small enough not to include too much of the image without border. In general, the choice of border region (inside, outside, on both sides of the preliminary border) and its width depend on the specific image and object being processed and the identification technique.

Figure 2B:
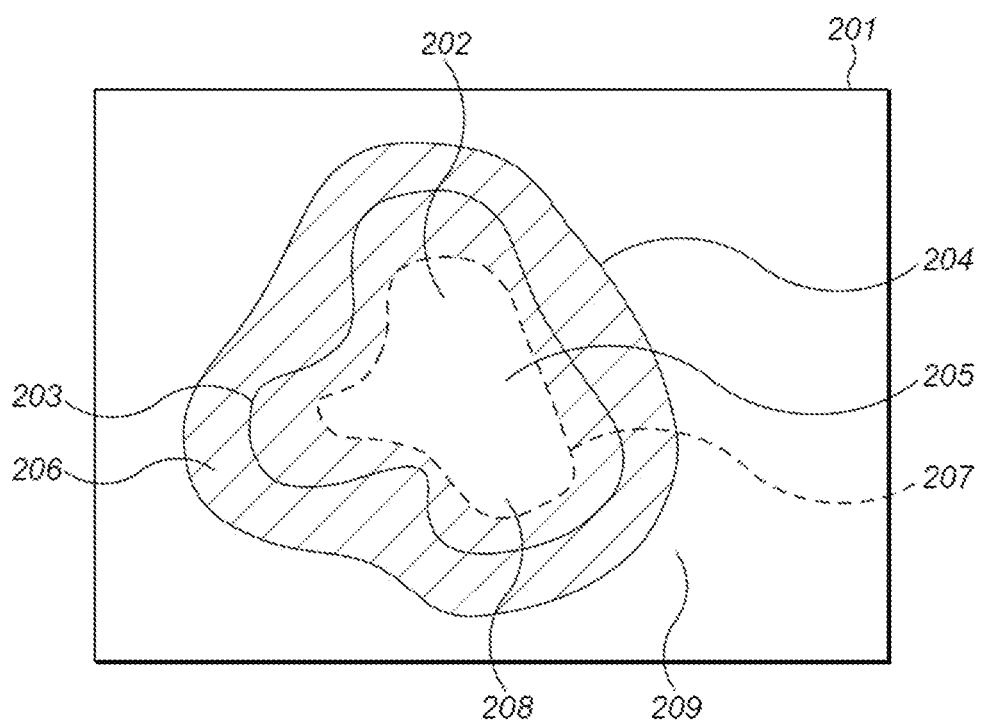

FIG. 2b shows the image 201 containing the object 202 defined by the border 203. A preliminary border 204 has been identified, defining a preliminary region 205. In this embodiment the preliminary border 204 is wholly outside the region of interest corresponding to the object 202, due to a specific choice of the identification technique.

According to an embodiment, a first border region 206 (hatched in the figure) is determined as extending from the preliminary border 204 to an edge 207. The edge 207, indicated by a dashed line, is wholly within the preliminary border 204, and thus the first border region is also wholly within the preliminary border 204. The first border region 206 defines an inner region 208 entirely within the edge 207, and an outer region 209 entirely outside the preliminary border 204.

Figure 2C:
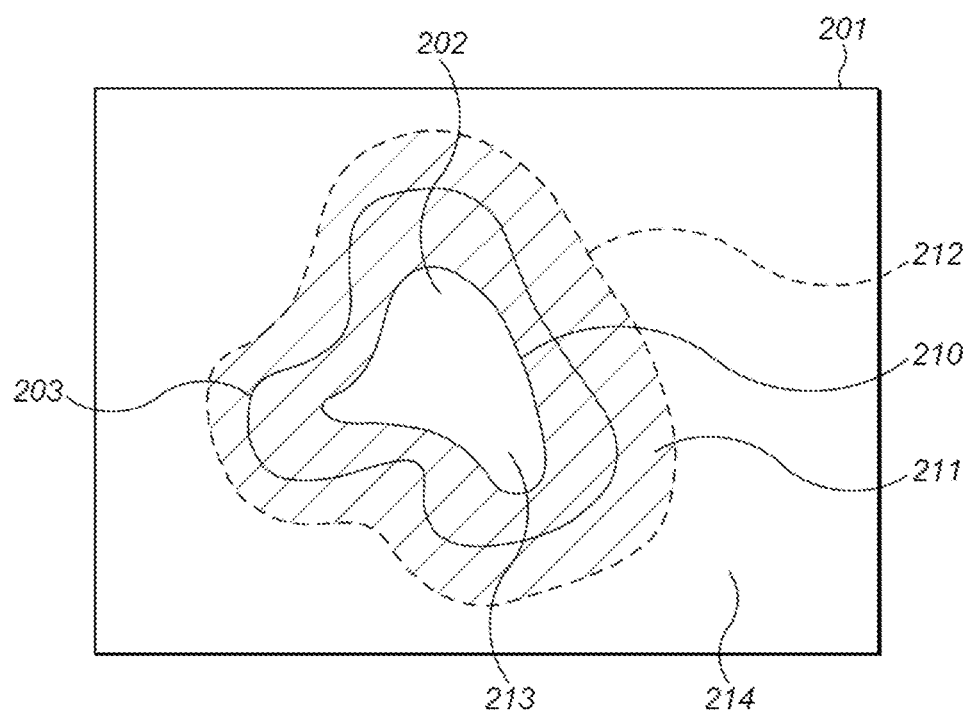

FIG. 2c also shows the image 201 containing the object 202 defined by the border 203. According to another embodiment, a preliminary border 210 has been determined, the preliminary border being wholly inside the region of interest corresponding to the object 202. The identification technique used in FIG. 2c in different from that used in FIG. 2b.

A first border region 211, hatched in the figure, is determined as extending from the preliminary border 210 to an edge 212. The edge 212, indicated by a dashed line, is entirely outside the preliminary border 210, and thus the first border region is also entirely outside the preliminary border 210. The first border region 211 defines an inner region 213 entirely within the preliminary border 210, and an outer region 214 entirely outside the edge 212.

Figure 2D:
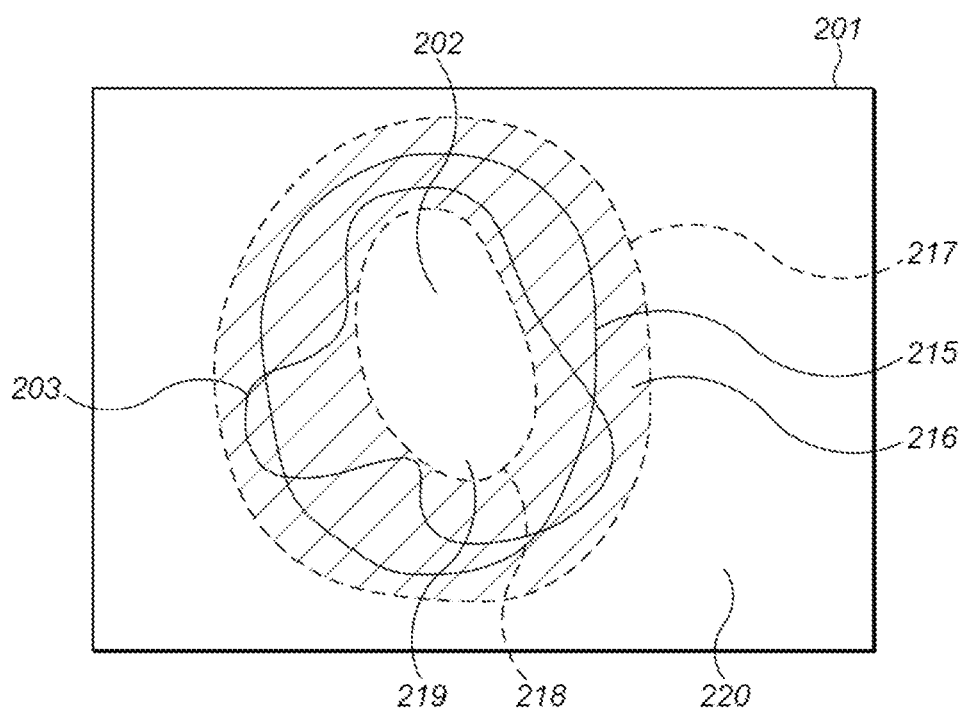

FIG. 2d also shows the image 201 containing the object 202 defined by the border 203. According to another embodiment, using an identification technique different from those used in FIGS. 2b and 2c, a preliminary border 215 has been determined, the preliminary border being partially inside and partially outside the region of interest corresponding to the object 202; hence, the preliminary border crosses the border 203 of the region of interest.

A first border region 216, hatched in the figure, is identified as extending from an outer edge 217 to an inner edge 218. The outer edge 217 is entirely outside the preliminary border 215, and the inner edge 218 is entirely inside the preliminary border 215. The preliminary border 215 is thus contained within the first border region 216. The first border region 216 defines an inner region 219 entirely within the inner edge 218, and an outer region 220 wholly outside the outer edge 217.

Figure 2E:
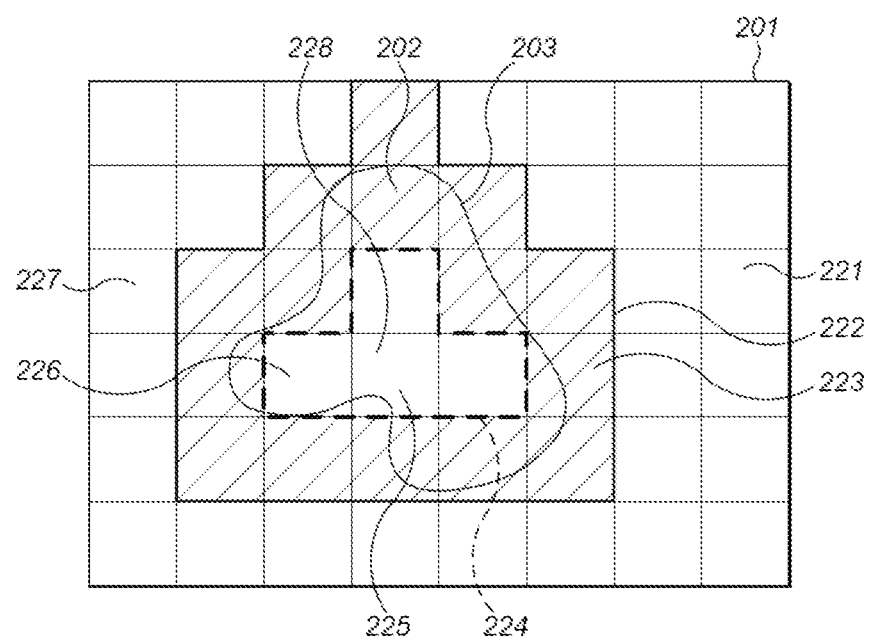

FIG. 2e depicts a method by which the preliminary region and the first border region may be determined. The image 201 containing the object 202 is divided into a grid of zones 221. For example, a 1000×1000 pixel image may be divided into a grid of 100×100 zones, each zone measuring 10×10 pixels. A preliminary border 222, indicated by a bold line in FIG. 2e, is determined based on the zones. The preliminary border follows the boundaries between zones such that each zone is either entirely within or entirely outside the preliminary border. A first border region 223, hatched in the figure, is determined as extending from the preliminary border 222 to an edge 224, the edge being within the preliminary border and indicated by a dashed line.

The edge 224 may be selected by, for example, requiring the first border region 223 to have a width of one zone. In the example shown in FIG. 2e, zones 225 and 226 are not within the border region but contain pixels of the ROI. If this situation is undesirable, the width of the border region may be increased such that the border of the object 203 is entirely within the first border region 223. The first border region 223 defines an outer region 227 wholly outside the preliminary border 222, and an inner region 227 wholly within the edge 224. Analyzing the image zone-by-zone in this manner is typically computationally faster than pixel-by-pixel analysis.

According to another embodiment, a preliminary border is determined on a pixel (as opposed to zone) basis and the image 201 is divided into a grid of zones 221 as depicted in FIG. 2e. The preliminary border may now pass through the zones instead of only following the zone boundaries. The first border region may then be defined to comprise the zones through which the preliminary border passes. The first border region may be enlarged relative to this by including zones adjacent to those through which the preliminary border passes. For example, zones inside the preliminary border, outside the preliminary border, or both inside and outside may be added in the cases whereby the preliminary border is wholly outside the region of interest, wholly inside the region of interest, or partially inside and outside the region of interest, respectively.

The approximation of the ROI defined by the preliminary border 204, 210, 215, 222 is then refined by statistical analysis of pixel color components by determining one or more probability distributions of the pixel color components. Examples of color components are red, green and blue in red-green-blue (RGB) color space, or hue, saturation and value in hue-saturation-value (HSV) color space. The probability distributions may be determined separately for the preliminary region and the region outside the preliminary region, in other words, inside the preliminary border 204, 210, 215, 222, and outside the preliminary border.

Alternatively, the probability distributions may be determined separately for the inner region 208, 213, 219, 227 and the outer region 209, 214, 220, 228. In this case pixels in the first border region 206, 211, 216, 223 are at least partly excluded from the determination from either or both probability distributions. The probability distributions will be better defined than those in the previous paragraph, because the inner region includes no or only a relatively small number of pixels that do not belong to the object. Similarly, the outer region includes no or only a relatively small number of pixels that belong to the object. A better definition of the probability distributions allows a more accurate assignment of pixels to the region of interest 202 and to outside the region of interest.

Pixels in the first border region may be excluded from either or both of these probability distributions. Alternatively, the pixels in the first border region may be partly excluded from either or both probability distributions by giving the pixels a weight in their contribution to the probability distributions. For example, in the case depicted in FIG. 2d, the weight for a given pixel may increase with perpendicular distance between the preliminary border and the pixel, from a weight of zero for pixels adjacent to the preliminary border to a weight of one for pixels at an edge of the border region.

As another example, in the embodiment depicted in FIG. 2e, the pixels in the first border region may also be included in either/both histograms, with a weight applied. The weight of a given pixel may be determined as described above, based on the perpendicular distance between the pixel and the preliminary border. Alternatively, all pixels within a given zone may have the same weight depending on the perpendicular distance between the preliminary border and the center of that zone.

Figure 3:
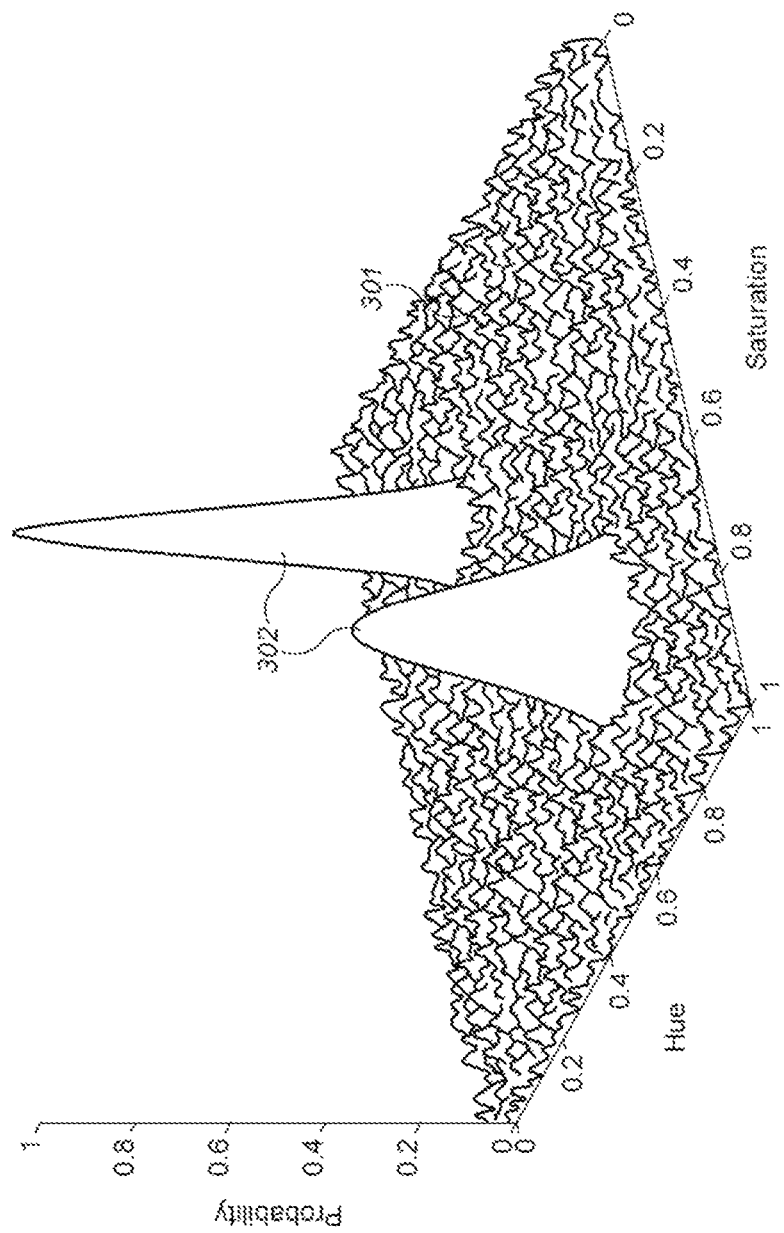
FIG. 3 shows a histogram of the hue and saturation components of color space for a part of an image.

The probability distributions may be two-dimensional histograms indicating the number of pixels having color components in given ranges. According to one embodiment, the color of each pixel is expressed in hue-saturation-value (HSV) color space; the two-dimensional histograms may then show distributions of pixels over hue and saturation. Typically such histograms contain peaks corresponding to the most common colors in the two regions, for example an inner region showing grass would contain peaks corresponding to green, yellow and brown, and an outer region covering sky would contain peaks corresponding to blue and white. FIG. 3 shows a hue-saturation histogram 301 of this type, containing two peaks 302 at different hue and saturation values for two different regions. The accuracy of the method may be increased by using three dimensional histograms which for example include the value component in addition to hue and saturation.

The adjustment of the preliminary border involves analyzing the pixels in the first border region 206, 211, 216, 223 determine whether they should be within or outside the ROI. This operation is performed by determining whether a given pixel corresponds more closely to the histogram of pixel color components in the inner region 208, 213, 219, 227 or to the histogram of pixel color components in the outer region 209, 214, 220, 228, or, alternatively, to the histogram of pixel color components in the preliminary region or to the histogram of pixel color components outside the preliminary region.

One method for determining to which histogram a pixel most closely corresponds is to produce a vector describing the distance between the two histograms, methods for this being known to those skilled in the art. The pixel in question may then be mapped onto this vector. A threshold can then be assigned to the vector, with pixels being assigned to the ROI if they lie between the threshold and the histogram corresponding to the inner region 208. Similarly, pixels are excluded from the ROI if they lie between the threshold and the histogram corresponding to the outer region 209.

In this manner, the accuracy of the determination of the border 203 of the ROI may be improved with respect to previous methods. The determination of distance between the histograms also provides a measure of the accuracy of the assignment of the pixels to the ROI or to outside the ROI, with a larger difference corresponding to a greater degree of accuracy. For example, in the embodiment shown in FIG. 2e in which the image is divided into a grid of zones, for sufficiently distant histograms the border may be determined to an accuracy of a single pixel, whereas for the worst case of very similar histograms the border may only be determined to an accuracy of one zone. Thus, the method is more accurate when identifying a region of significantly different color component distribution to the rest of the image.

Figure 4:
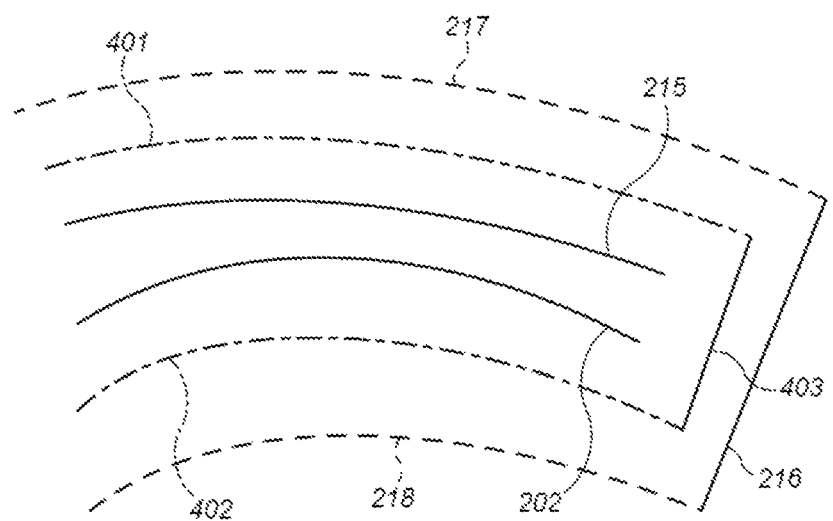
FIG. 4 shows a second border region of smaller width than a first border region

FIG. 4 shows a close-up view of an area in FIG. 2d around a segment of the object border 202. Also shown is the preliminary border 215 and the outer edge 217 and inner edge 218 of the first border region 216. A second outer edge 401 and a second inner edge 402 may be defined, the area between these edges being a second border region 403. If the width of the second border region is smaller than the width of the first border region, the computational speed of the method described above to assign pixels to regions may be increased by using the second border region instead of the first border region, because there are fewer pixels to analyse.

Although several method steps have been explained with reference to FIG. 2b, the same method steps can be applied to the situations shown in FIGS. 2c, 2d and 2e.

Once the border 203 of the ROI has been identified, different image processing techniques, well-known to those skilled in the art, may be applied within the ROI to those applied outside the ROI. For example, a sharpening algorithm may be applied, sharpening a region corresponding to grass to a greater degree than a region corresponding to sky. In this manner, the undesired production of image artefacts in the sky region, where they may be more noticeable, may be averted. By way of another example, a color correction algorithm may be applied to human faces, with a different color correction algorithm being applied to the background of the image. Other image processing techniques include reduction of noise and white balancing.

The first border region may also be used in more areas that apply an algorithm to an image. An algorithm may be applied to a selected region of an image. A border region is determined that includes the border of the selected region. The border region is excluded at least in part from the algorithm. Any irregularities near the border of the selected region will not be included in the processing, thereby reducing artefacts in the processed image. The border region may be determined as described above with reference to the first border region in FIGS. 2b-e. The border region may be wholly excluded from the algorithm or in part. In the latter case, parts of the border region to which the algorithm is applied may be weighted with a weight increasing with distance of the parts from the border. The algorithm may be applied to the region inside or to the region outside the border region, the border region itself being at least partly excluded. If a first algorithm is applied to the region within the border region, a second algorithm, possibly different to the first one, may be applied to the region outside the border region. One or both of the algorithms may be the known determination of a region of interest in an image using a single probability distribution, such as a histogram. The algorithm may be the above determination of the probability distribution of color components. The result of the algorithm will be more accurate if the probability distribution is determined over the region excluding at least partly the border region. One or both of the algorithms may be a known image processing technique such as sharpening, color correction, reduction of noise or white balancing.

In addition to identifying a single region in an image, the technique described here may be used to identify multiple regions of interest simultaneously, for example corresponding to multiple human faces in an image, or corresponding to grass, sky and water in a landscape image. If multiple regions of interest in an image relating to similar objects, such as faces, are to be determined, the histogram of the outer region should cover only pixels outside all preliminary regions corresponding to the regions of interest. The technique may also be applied automatically, for example to images captured by a camera, or it may be applied at the manual request of a user, for example in image manipulation software.

Figure 5:
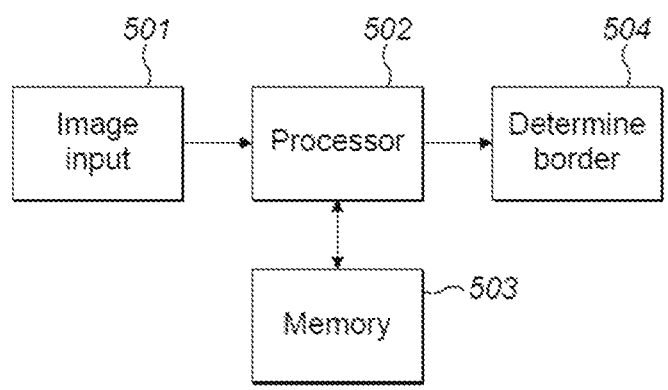
FIG. 5 shows an apparatus for implementing an object border detection method.

An apparatus for carrying out the above described method is shown in FIG. 5. An input 501 for images is connected to a processor 502 and a memory 503 which includes computer program instructions. The instructions are configured to cause the processor to identify the border of an object in the image in the manner described above. The shape and position of the border is then output 504. The apparatus may for example be implemented in a camera or computer, and the image may be input from a camera sensor or from a memory. The output may for example be to a screen, or stored in memory.

Embodiments may be implemented in a computer program product comprising a non-transitory computer readable storage medium having computer readable instructions stored thereon, the computer readable instructions being executable by a computerized device to cause the computerized device to determine the orientation of an object in an image in the manner described above.

The above embodiments are to be understood as illustrative examples only. Further embodiments of the invention are envisaged. For example, embodiments may be implemented in a camera, a computer, or other image processing means. Embodiments may also be implemented in hardware or software. In addition, while the description is directed to a rectangular grid of "zones", it will be appreciated that the method may equally well be applied given an alternative method for approximate determination of the border of an ROI. It is to be understood that any feature described in relation to any one embodiment may be used alone, or in combination with other features described, and may also be used in combination with one or more features of any other of the embodiments, or any combination of any other of the embodiments. In particular, features of the embodiments shown in FIGS. 2 and 4 relating to determining the border region and to determining a probability distribution can also be used in the method where an image processing technique is applied to a selected region of an image. Furthermore, equivalents and modifications not described above may also be employed without departing from the scope of the invention.

What is claimed is:

1. A method of selecting at least one region of interest within an image, performed on an apparatus comprising at least one processor and at least one memory, the method comprising:
    selecting a preliminary region having a preliminary border using one or more characteristics of the image;
    determining an inner probability distribution of color components within the preliminary region and an outer probability distribution of color components outside the preliminary region;
    adjusting the preliminary border in dependence on the probability distributions, the adjusted border defining the at least one region of interest.

2. The method of claim 1, further comprising selecting a first border region including the preliminary border.

3. The method of claim 2, wherein the first border region is selected to be inside, outside, and both inside and outside the preliminary border for the preliminary border being wholly outside the region of interest, wholly inside the region of interest, and partially outside the region of interest, respectively.

4. The method of claim 2, wherein the determining of at least one of the inner and outer probability distributions excludes the first border region.

5. The method of claim 2, wherein the determining of at least one of the inner and outer probability distributions includes the first border region, and wherein contributions to at least one of the inner and outer probability distributions from the first border region are weighted with a weight increasing with distance of the contribution from the preliminary border.

6. The method of claim 1, wherein the inner probability distribution is an inner color component histogram and the outer probability distribution is an outer color component histogram.

7. The method of claim 6, wherein the inner and outer color component histograms are in at least two color components of color space.

8. The method of claim 6, wherein the inner and outer color component histograms are two-dimensional histograms in hue and saturation components of hue-saturation-value color space.

9. The method of claim 6, wherein the adjusting of the preliminary border comprises:
    determining whether a pixel corresponds more closely to the inner color component histogram or to the outer color component histogram; and
    assigning the pixel to be within or outside the region of interest accordingly.

10. The method of claim 9, further comprising:
    determining a vector indicative of a distance between the inner and outer color component histograms;
    defining a threshold on the vector;
    mapping the pixel onto the vector;
    assigning the pixel to within the region of interest if its mapping to the vector is on the side of the threshold closest to the inner color component histogram; and
    assigning the pixel to outside the region of interest if its mapping to the vector is on the side of the threshold closest to the outer color component histogram.

11. The method of claim 1, wherein the analyzing of at least one of the inner and outer probability distributions of color components is carried out in hue-saturation-value color space.

12. The method of claim 2, further comprising selecting a second border region including the preliminary border.

13. The method of claim 12, wherein the adjusting of the preliminary border includes assigning pixels of the image only in the second border region to the region of interest or to outside the region of interest.

14. The method of claim 12, wherein the first border region has a first width and the second border region has a second width, the first width being larger than or equal to the second width.

15. The method of claim 1, further comprising dividing at least part of the image including the region of interest into a grid of zones.

16. The method of claim 15, wherein the preliminary region is defined in zones.

17. The method of claim 15, wherein at least part of the image is defined in zones.

18. The method of claim 1, further comprising applying one or more image processing techniques to the image after adjusting the extent of the regions of interest.

19. The method of claim 18, wherein the one or more processing techniques applied to the image differs between the region of interest and outside the region of interest.

20. The method of claim 18, wherein the one or more image processing techniques applied to the image include at least one of: increasing or decreasing of sharpness, reduction of noise, adjustment of color, and white balancing.

21. The method of claim 1, wherein the characteristics include at least one of: color information, depth information, and the presence of one of more faces recognized by facial recognition.

22. An apparatus for processing an image, the apparatus comprising:
    at least one processor; and at least one memory comprising computer program instructions, the at least one memory and the computer program instructions being configured to, with the at least one processor, cause the apparatus to perform a method of selecting at least one region of interest within an image, the method comprising:

selecting a preliminary region having a preliminary border using one or more characteristics of the image;

determining an inner probability distribution of color components within the preliminary region and an outer probability distribution of color components outside the selected region; and adjusting the preliminary border in dependence on the probability distributions, the adjusted border defining the at least one region of interest.

23. The apparatus of claim 22, wherein the method further comprises selecting a first border region including the preliminary border, and wherein the determining of at least one of the inner and outer probability distributions at least partially excludes the first border region.

24. A non-transitory computer-readable storage medium comprising computer-executable instructions which, when executed by a processor, cause a computing device to perform a method of selecting at least one region of interest within an image, the method comprising:

selecting a preliminary region having a preliminary border using one or more characteristics of the image;

determining an inner probability distribution of color components within the preliminary region and an outer probability distribution of color components outside the selected region;

adjusting the preliminary border in dependence on the probability distributions, the adjusted border defining the at least one region of interest.

25. The non-transitory computer-readable storage medium of claim 24, wherein the method further comprises selecting a first border region including the preliminary border, wherein the determining of at least one of the inner and outer probability distributions at least partially excludes the first border region.

26. A method of processing an image, performed on an apparatus comprising at least one processor and at least one memory, the method comprising:

selecting a region having a border using one or more characteristics of the image;

selecting a border region including the border; and applying a first algorithm to the region excluding at least partially the border region.

27. The method of claim 26, wherein the first algorithm comprises determining a probability distribution of color components.

28. The method of claim 26, wherein the first algorithm is applied to the region excluding entirely the border region.

29. The method of claim 26 wherein the application of the first algorithm to a part of the border region is weighted with a weight increasing with distance of the part from the border.

30. The method of claim 26, wherein the border region is selected to be inside, outside, and both inside and outside the border, for the border being wholly outside the region, wholly inside the region, and partially outside the region, respectively.

31. The method of claim 26, further comprising applying a second algorithm to the region outside the border region.

32. An apparatus for processing an image, the apparatus comprising:

at least one processor; and at least one memory comprising computer program instructions, the at least one memory and the computer program instructions being configured to, with the at least one processor, cause the apparatus to perform a method of processing an image, the method comprising:

selecting a region having a border using one or more characteristics of the image;

selecting a border region including the border;

applying a first algorithm to the region excluding at least partially the border region.

33. A non-transitory computer-readable storage medium comprising computer-executable instructions which, when executed by a processor, cause a computing device to perform a method of processing an image, the method comprising:

selecting a region having a border using one or more characteristics of the image;

selecting a border region including the border;

applying a first algorithm to the region excluding at least partially the border region.

* * * * *